(12) United States Patent
Reunamäki et al.

(10) Patent No.: US 7,613,222 B2
(45) Date of Patent: Nov. 3, 2009

(54) WIDEBAND COMMUNICATION METHOD

(76) Inventors: Jukka Reunamäki, Hatanpäänkatu 11 B 21, FI-33900 Tampere (FI); Arto Palin, Rantatie 39, FI-37830 Viiala (FI)

( * ) Notice: Subject to any disclaimer, the term of this patent is extended or adjusted under 35 U.S.C. 154(b) by 531 days.

(21) Appl. No.: 10/574,591

(22) PCT Filed: Nov. 12, 2004

(86) PCT No.: PCT/FI2004/000673

§ 371 (c)(1),
(2), (4) Date: Apr. 4, 2006

(87) PCT Pub. No.: WO2005/048477

PCT Pub. Date: May 26, 2005

(65) Prior Publication Data

US 2007/0053409 A1 Mar. 8, 2007

(30) Foreign Application Priority Data

Nov. 17, 2003 (FI) .................................. 20031666

(51) Int. Cl.
*H04B 1/00* (2006.01)
(52) U.S. Cl. ................ 375/130; 375/219; 375/239; 375/256
(58) Field of Classification Search ................ 375/130, 375/219, 239, 256
See application file for complete search history.

(56) References Cited

U.S. PATENT DOCUMENTS

| 2002/0061081 | A1 | 5/2002 | Richards et al. | 375/346 |
| 2003/0020985 | A1* | 1/2003 | LaGasse et al. | 359/135 |
| 2003/0043934 | A1 | 3/2003 | Roberts | 375/316 |
| 2003/0189975 | A1 | 10/2003 | Fullerton | 375/219 |
| 2003/0194979 | A1 | 10/2003 | Richards et al. | 455/216 |

FOREIGN PATENT DOCUMENTS

| WO | WO-01/39451 A1 | 5/2001 |
| WO | WI-01/93441 A1 | 12/2001 |

OTHER PUBLICATIONS

The International Search Report for PCT/FI2004/000673 mailed on Mar. 7, 2005.
The Written Opinion for PCT/FI2004/000673 mailed on Mar. 7, 2005.
The International Preliminary Report on Patentability for PCT/FI2004/000673 completed Oct. 7, 2005.
The Communication concerning EP 04 798 282.2 dated Jan. 7, 2008.

* cited by examiner

*Primary Examiner*—Curtis B Odom (57) ABSTRACT

A communication method includes establishing a wideband communication link between a first device and a second device, transmitting a first set of consecutive data bits from the first device to the second device by means of a first set of pulses, and transmitting a second set of bits from the second device to the first device at least partially simultaneously or at least partially interlaced with the first set of bits.

30 Claims, 5 Drawing Sheets

WIDEBAND COMMUNICATION METHOD

FIELD OF THE INVENTION

The invention relates to wideband communications and especially to ultra-wideband (UWB) communications.

BACKGROUND OF THE INVENTION

Ultra-wideband (UWB) communication technology has been known for decades. Actually, in 1887, German physicist Heinrich Hertz, discovered radio waves by using a spark gap transmitter, which can been considered as an early UWB radio. That is, the first radio transmission ever made employed UWB technology. Later the use of UWB radios was banned because they use a relatively wide spectrum and therefore UWB technology was not used in commercial communication applications for a long time. However, in late 1990s, the use of UWB technology was brought up again and in 2002 FCC (Federal Communications Commission) permitted the marketing and operation of UWB devices in the USA, which enables public use of UWB communications. It is likely that public use of UWB communications will be allowed also in other parts of the world.

The FCC regulations permit the usage of UWB transmission for communication purposes in the frequency band of 3.1-10.6 GHz. With current ruling the transmitted spectral density has to be under −41.3 dBm/MHz and the utilized bandwidth has to be higher than 500 MHz.

In general, UWB devices operate by employing very narrow or short duration pulses that result in very large or wideband transmission bandwidths. That is, information is sent over the air by using pulses instead of continuous wave, which is used in most of the conventional radios. The frequency, in which the pulses are repeated (Pulse Repetition Frequency, PRF), can be selected to be lower than the channel coherence time (1/delay spread of the channel) of the respective communication link so that there is no need for equalization in the receiver. Therefore, there is a certain guard time between the pulses. Because the spectrum used for UWB communications is in GHz range, the used pulses have to be very short in order to fulfill the spectrum requirements. Depending on utilized technology, the pulse lengths are typically around a couple of pico- or nanoseconds, while the guard time between the pulses may be in the scale of tens or hundreds of nanoseconds.

So-called Impulse Radio (IR) concept is one of the technologies that fulfill the requirements set to UWB technologies. In IR the data is sent by using short baseband pulses, that is, there is no carrier included in the transmission. Also so called RF gating type of impulse radio can be used in UWB communications. Therein the actual pulse is a gated RF pulse, which is a sine wave masked in time domain with a certain pulse shape.

A basic IR transmitter is relatively simple, since in its simplest form an IR transmitter comprises basically only a pulse generator and an antenna. Because transmission power in an IR radio is low, there is no need for a power amplifier, and because signaling is baseband signaling, there is no need for a mixer or for a VCO (Voltage Controlled Oscillator) An IR receiver is more complex than the IR transmitter. Nevertheless, an IR receiver is simpler than a conventional continuous wave receiver, at least in principle, since in an IR receiver, there is no need for intermediate frequencies or filters, which simplifies the receiver.

UWB communications are typically short range, high speed, peer-to-peer communications, that is, communications between two end-user devices. In present UWB communication applications, a physical communication channel is shared between uplink (data transmitted from a first end-user device to a second end-user device) and downlink (data transmitted from the second end-user device to the first end-user device) in a time division type of manner. That is, the physical communication channel is divided into time slots in time domain and some of the time slots are allocated to the downlink and some of the time slots are allocated to the uplink. Link control information, such as acknowledgement messages, which is needed for maintaining the communication link between the communicating parties, is sent in the same physical channel with the actual data.

Since UWB communications are still in the development phase, all details of commercial UWB applications have not been agreed on yet and many details may still require further considerations.

SUMMARY OF THE INVENTION

Now it has been observed that especially in unidirectional UWB (ultra-wideband) data transmission sending the link control information in a time division type of manner as described above may result in wasting link capacity. When data traffic is unidirectional (for example when downloading large amount of data from one device to another device) all link capacity cannot be used for downloading purposes because link control information have to be transmitted between the communicating devices in order to maintain the communication link. The link control information is usually transmitted with much lower data rate than the maximum data rate of the communication link, or at least the amount of data that is required for example for sending acknowledgement data, is low. Nevertheless, the control information is sharing the same physical channel with data packets and thus relatively large amount of transmission capacity is reserved for the control information. Additionally, in many cases link control information does not lead to any action, such as retransmission. Therefore, link capacity may be wasted without any gain to the system performance.

Now, starting from the observations presented above a method of improving the transmission capacity of wideband communications, such as UWB communications, at least in connection with unidirectional data transmission has been invented.

An embodiment of the invention is based on the idea of sending control information (or some other data) in uplink substantially simultaneously or interlaced with receiving data in downlink. The control information may be sent for example during guard times between received data pulses or by using a separate radio, the separate radio typically having lower data rate than the UWB radio. Typically such separate radio is a Wireless Personal Area Network (WPAN) radio, such as a Bluetooth radio or a WLAN (Wireless Local Area Network) radio. Also any other suitable radio may be used.

It must be noted that herein the terms uplink and downlink are used simply for referring to opposite directions of data transmission and therefore they can be used interchangeably.

According to a first aspect of the invention, there is provided a communication method comprising:

establishing a wideband communication link between a first device and a second device, transmitting a first set of consecutive data bits from said first device to said second device by means of a first set of pulses, and transmitting a second set of bits from said second device to said first device at least partially simultaneously or at least partially interlaced with said first set of bits.

The pulses that are used are for example narrow pulses or impulses.

Said second set of bits may comprise any bits that need to be transmitted. Such bits may comprise for example control data, such as acknowledgement messages and reception power level information. However, depending on the implementation the second set of bits may comprise also actual uplink data, thereby providing a fully two-directional communication link.

According to a second aspect of the invention, there is provided a system comprising a first device and a second device configured to establish a wideband communication link between said first and second devices, said first device comprising a transmitter configured to send a first set of consecutive data bits to said second device and said second device comprising a receiver configured to receive said first set of consecutive data bits from said first device, said first set of bits being sent by means of a first set of pulses, wherein said second device further comprises a transmitter configured to send a second set of bits to said first device at least partially simultaneously or at least partially interlaced with receiving said first set of bits from said first device, and in that said first device further comprises a receiver configured to receive said second set of bits from said second device at least partially simultaneously or at least partially interlaced with sending said first set of bits to said second communication device.

According to a third aspect of the invention, there is provided a device comprising a receiver configured to receive a first set of consecutive data bits from another device, said first set of bits being sent by means a first set of pulses, and a transmitter configured to send a second set of bits to said another device at least partially simultaneously or at least partially interlaced with receiving said first set of bits from said another device.

According to a fourth aspect of the invention, there is provided a device comprising a transmitter configured to send a first set of consecutive data bits to another device by means of a first set of pulses, and a receiver configured to receive a second set of bits from said another device at least partially simultaneously or at least partially interlaced with sending said first set of bits to said another device.

A device according to the invention may be any suitable electronic device such as a communication device, a mobile phone, a laptop computer, a desktop computer, a Personal Digital Assistant (PDA), or a digital camera. The features of the devices according to the third and fourth aspects may be combined so that some of the features or all of them are implemented in one device.

According to a fifth aspect of the invention, there is provided a computer program according to claim 29.

Dependent claims contain some embodiments of the invention. The subject matter contained in dependent claims relating to a particular aspect of the invention is also applicable to other aspects of the invention.

A benefit of some embodiments of the invention is that they improve UWB communication data rate by providing a method for sending uplink information without reducing downlink data rate. However, it must be noted that in addition to UWB communication technology, the invention can be used in connection with any other suitable communication technology employing narrow or short duration pulses or impulses in data transmission purposes.

Some embodiments of the invention are well suited especially for sending control information and/or improving data rate of a unidirectional data transmission, but the invention is not restricted only to these specific cases. Instead the methods of the invention can be used for sending any suitable uplink information.

BRIEF DESCRIPTION OF THE DRAWINGS

Embodiments of the invention will now be described by way of example with reference to the accompanying drawings in which.

DETAILED DESCRIPTION

Some example implementations of the invention are described below in connection with UWB communications. Especially examples concerning transmission of control information are given. Nevertheless, these application domains are given only as examples without restricting the scope of the invention.

UWB communications herein refer in general to a communication technology, wherein data is transmitted by means of narrow or short duration pulses or impulses, transmitted pulses or impulses being spaced apart in time domain by a certain guard time.

Figure 1A:
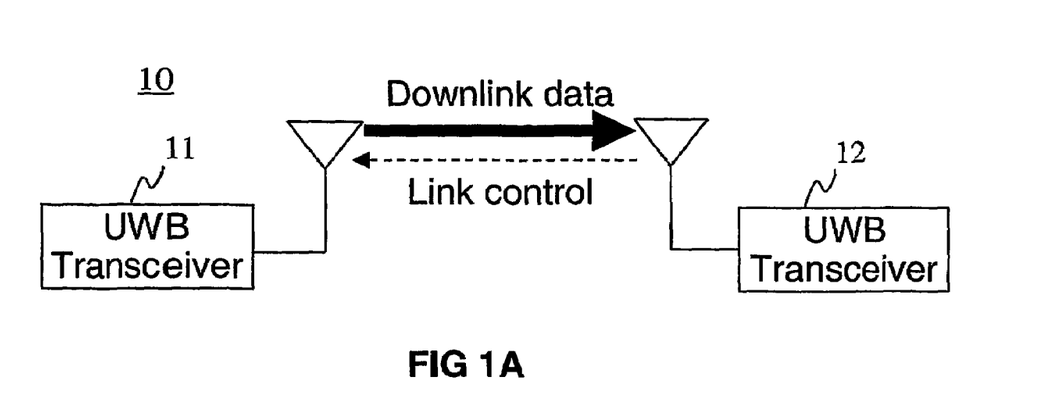
FIG. 1A is a block diagram illustrating a system according to an embodiment of the invention.

FIG. 1A is a block diagram illustrating a system 10 according to an embodiment of the invention. The system 10 comprises two UWB transceivers (or equally UWB devices comprising transceivers) 11 and 12. The UWB transceivers 11 and 12 are configured to establish a UWB communication link between them. The UWB transceiver 11 transmits downlink data to the UWB transceiver 12 and the UWB transceiver 12 sends link control information in uplink substantially simultaneously or interlaced with receiving data in downlink.

In practice the UWB transceiver 11 may be for example a digital camera or mobile phone, while the UWB transceiver 12 can be a desktop or laptop computer. Data that is transmitted in downlink may be for example data files, such as digital photographs, to be stored or processed in the (desktop or laptop) computer. Especially in the case of digital camera there is typically no need to transfer large amounts of data to the camera. Thus data transfer is at least mainly unidirectional and in some implementations only unidirectional data transfer may be enabled. Nevertheless, it must be noted that the devices and practical use cases discussed herein are given as examples only without restricting the scope of the invention. That is, any suitable wideband transceiver may be used in the system 10 of FIG. 1A. Furthermore, a transceiver may actually comprise separate receiver and transmitter.

The link control information above may be sent for example during guard times between received data pulses or by using a separate radio, the separate radio typically having lower data rate than the UWB radio. These alternatives are further discussed below.

Figure 1B:
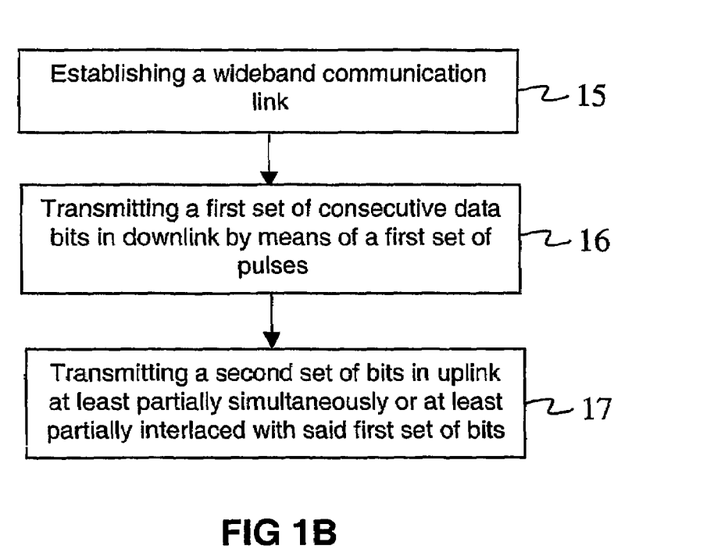
FIG. 1B is a flow diagram illustrating in a general level a method according to an embodiment of the invention.

FIG. 1B is a flow diagram illustrating in a general level a method according to an embodiment of the invention. The method can be used for example in the system of FIG. 1A.

In step 15 a wideband communication link is established between a first device and a second device (for example the UWB transceivers 11 and 12 of FIG. 1A). Then in steps 16 and 17, a first set of consecutive data bits is transmitted in downlink by means of a first set of pulses and a second set of bits is transmitted in uplink at least partially simultaneously or at least partially interlaced with said first set of bits. The details of sending uplink information are further discussed below.

Figure 2A:
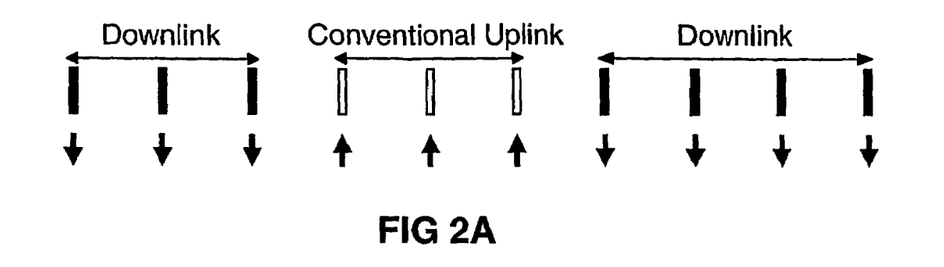
FIGS. 2A-2B illustrate differences between prior art and an embodiment of the invention.
Figure 2B:
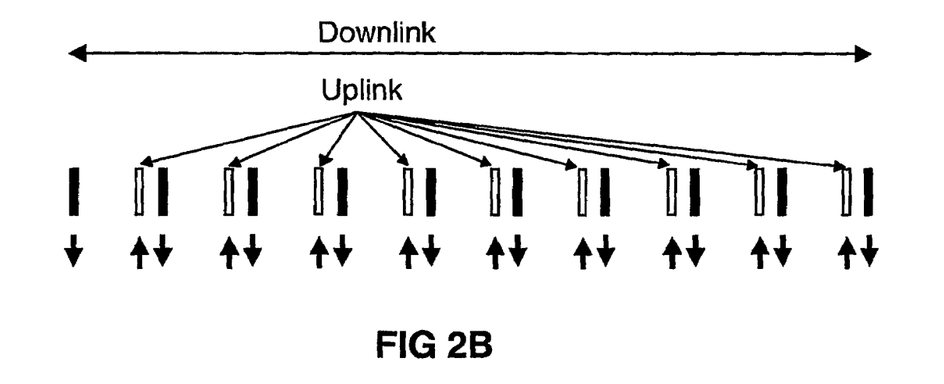

FIGS. 2A and 2B illustrate differences between prior art and an embodiment of the invention. Vertical bars in the Figures illustrate information pulses and arrows indicate transmission direction of the pulses.

FIG. 2A shows a prior art arrangement, in which the communication channel is divided between downlink and uplink in a time division type of manner. That is, for a certain period of time bits are sent in downlink direction and then the transmission direction is changed. In practice the communication channel is divided into time slots in time domain and some of the time slots are allocated to the downlink and some of the time slots are allocated to the uplink. Now, even when data transmission is unidirectional, some of the time slots need to be reserved for uplink in order to send link control information for maintaining the communication link.

FIG. 2B shows an arrangement of an embodiment of the invention, wherein link control information is interlaced with downlink data transmission. The whole communication channel (all time slots of FIG. 2A) is used for downlink transmission and link control information in uplink direction is sent during the guard times between the downlink pulses. Naturally data transmission direction may be changed whenever needed, but now there is no need to reserve full time slots for sending control information.

Because the link control packets, such as acknowledgement packets, are smaller than typical data packets, link control packets can be easily sent between downlink pulses. Therefore an acknowledgement of a downlink data packet can be sent by the interlaced manner during transmission of the downlink data packet. The guard time between consecutive pulses is often much larger that the channel delay spread, because in many UWB systems a fixed pulse repetition frequency (PRF) is used. This makes it likely that there is room for interlacing link control information in between downlink pulses. Herein it must be noted that link control information can be sent in uplink with the same data rate, which the downlink data is using. Hence, the link control information in uplink may comprise a large amount of forward error correction and sending the link control information can be made reliable.

Figure 3A:
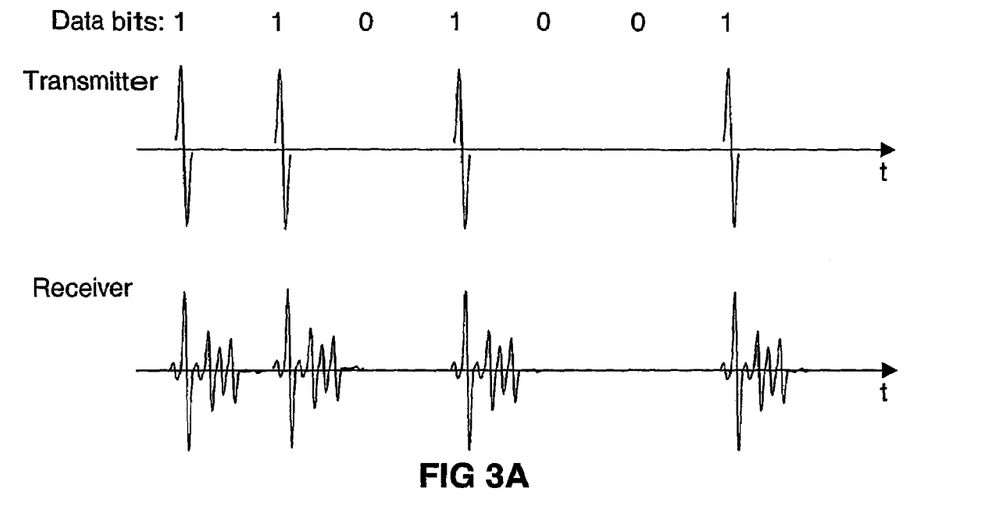
FIGS. 3A-3B illustrate a method of interlacing sent bits with received bits.
Figure 3B:
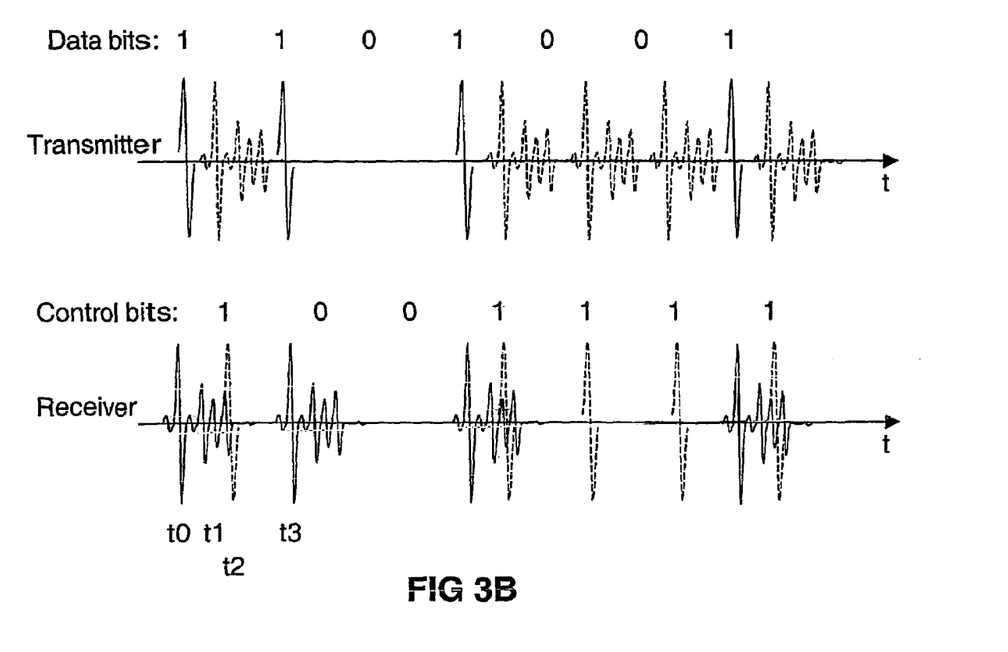

FIGS. 3A and 3B further illustrate a method of interlacing sent bits with received bits. The Figures show in time domain data pulses sent from a transmitter and the form in which the pulses are received at a receiver. A one is transmitted by sending a pulse, and a zero is transmitted by sending nothing. Also an opposite implementation is possible, that is, a pulse can be sent for every zero. Furthermore any other method, in which a data bit is presented by means of a simple baseband pulse shape, can be used. For example, a zero may be presented by an inverted pulse. The timing of sent pulses has been negotiated between the transmitter and the receiver, so that the receiver "knows" when to listen to sent pulses. On the basis of the energy received the receiver concludes whether a one or a zero was received.

FIG. 3A shows the shape of a bit sequence of "1101001" at the transmitter and corresponding received energy at the receiver (downlink transmission).

FIG. 3B shows the shape of the same bit sequence of "1101001" at the transmitter and corresponding received energy at the receiver. In addition FIG. 3B shows sending a second bit sequence of "1001111" (dashed lines) from the receiver to the transmitter (uplink transmission). The pulses transmitting the second bit sequence are sent interlaced with the bits received at the receiver.

Let's assume that the receiver is able to conclude from the energy received between the points of time t0 and t1, whether the bit received was one or zero. That is, all of the received energy is not needed for detecting a received pulse and therefore the "tail" of the received pulse can be ignored. As the next pulse is expected to be received at the point on time t3, a pulse can be sent at the point of time t2 without disturbing data transmission from the transmitter to the receiver.

It must be noted that there may be situations where the whole guard time is consumed by the delay spread of the received pulse. In such case the use of method shown in FIG. 3B may disturb downlink data transmission. Therefore in a practical implementation, it should be negotiated between the transmitter and receiver, whether the guard times between received downlink bits are used for sending uplink bits. That is, a communication link is first established in a conventional manner and, if the circumstances allow it, the transmitter and the receiver agree on sending uplink bits interlaced with downlink bits. The determination of whether uplink bits shall be interlaced can be based on the relationship between the PRF of the communication link and delay spread measured for the communication link. Moreover, the use of the method of interlacing uplink bits may be renegotiated at any time during maintaining the communication link. For example, the delay spread of the communication link may be monitored continuously or from time to time and if necessary interlacing uplink bits may be started or suspended at any suitable moment.

Figure 4:
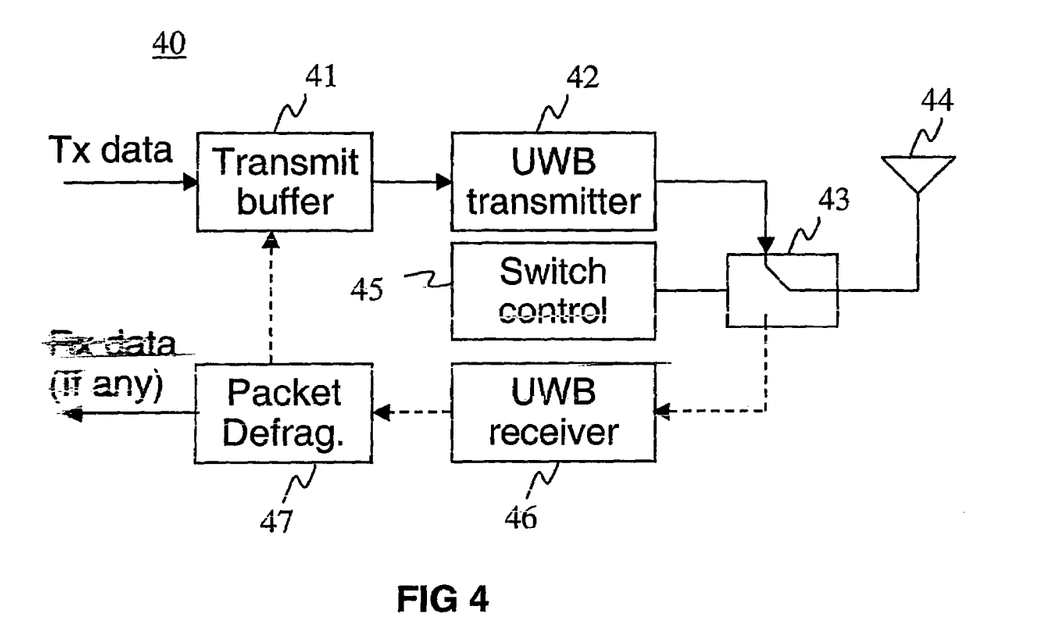
FIG. 4 is a block diagram illustrating a UWB communication module according to an embodiment of the invention.

FIG. 4 is a block diagram illustrating a UWB communication module 40 according to an embodiment of the invention. In practice the communication module 40 may be for example an integral part of a UWB device or an independent module operating for example in co-operation with other modules of a module assembly. The module 40 comprises a transmit buffer block 41, which buffers the data to be transmitted and takes care of possible retransmissions. The transmit buffer block is coupled to a UWB transmitter block 42, which generates the pulses to be transmitted and which is further coupled to an antenna 44 via a switch 43. The switch 43 couples also a UWB receiver block 46 to the antenna 44. A switch control block 45, which controls switching between UWB transmitter and UWB receiver, is coupled to the switch. The UWB receiver is further coupled to a packet defragmentation block 47, which is coupled to the transmit buffer 41 and which outputs received data from the communication module 40.

Let's now consider transmitting data and receiving acknowledgement messages by means of the communication module 40. Now dashed lines in the FIG. 4 show the path of acknowledgement messages. The switch control block 45 controls the switch 43 to switch between transmitting data pulses and receiving acknowledgement message pulses. If the acknowledgement message pulses indicate that some data needs to be retransmitted, the transmit buffer arranges the retransmissions.

Herein it must be noted that the acknowledgement messages (or other control data) is not necessarily related to the data bits with which they interlace. Instead, it is common that acknowledgement messages relate to some previously sent data.

Equally, the communication module 40 may be used for receiving data and transmitting acknowledgement messages (or other control information).

Figure 5:
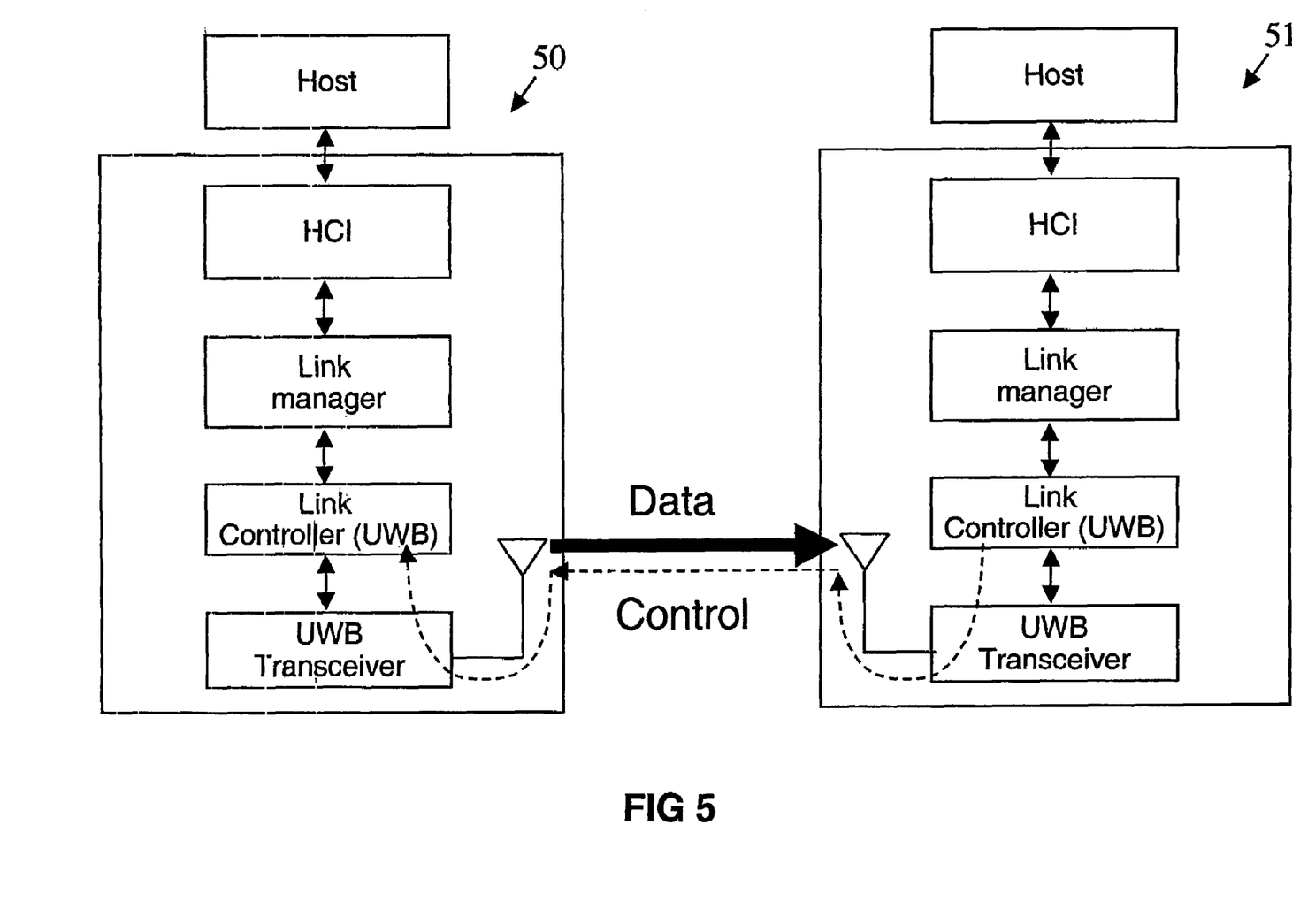
FIG. 5 illustrates a protocol stack structure depicting a method of sending control data bits interlaced with received data bits.

FIG. 5 illustrates a protocol stack structure depicting a method of sending control data bits interlaced with received data bits. Therein, a rough protocol stack structure of two communication parties 50 and 51 is shown. Both communicating parties comprise a UWB radio and corresponding protocol stack. A protocol stack comprises application level layers (Host), HCI (Host Controller Interface) layer, link manager layer, fink controller layer and UWB transceiver layer (physical layer). Data is sent "normally" from application layer (Host) at the transmitting end 50 via HCI, link manager, link controller and physical layer to air interface (antenna) and again via air interface, physical layer, link controller, link manager and HCI to application layer at the receiving end 51. Control data is sent on a link controller level (dashed arrows) from communication party 51 to communication party 50.

Figure 6:
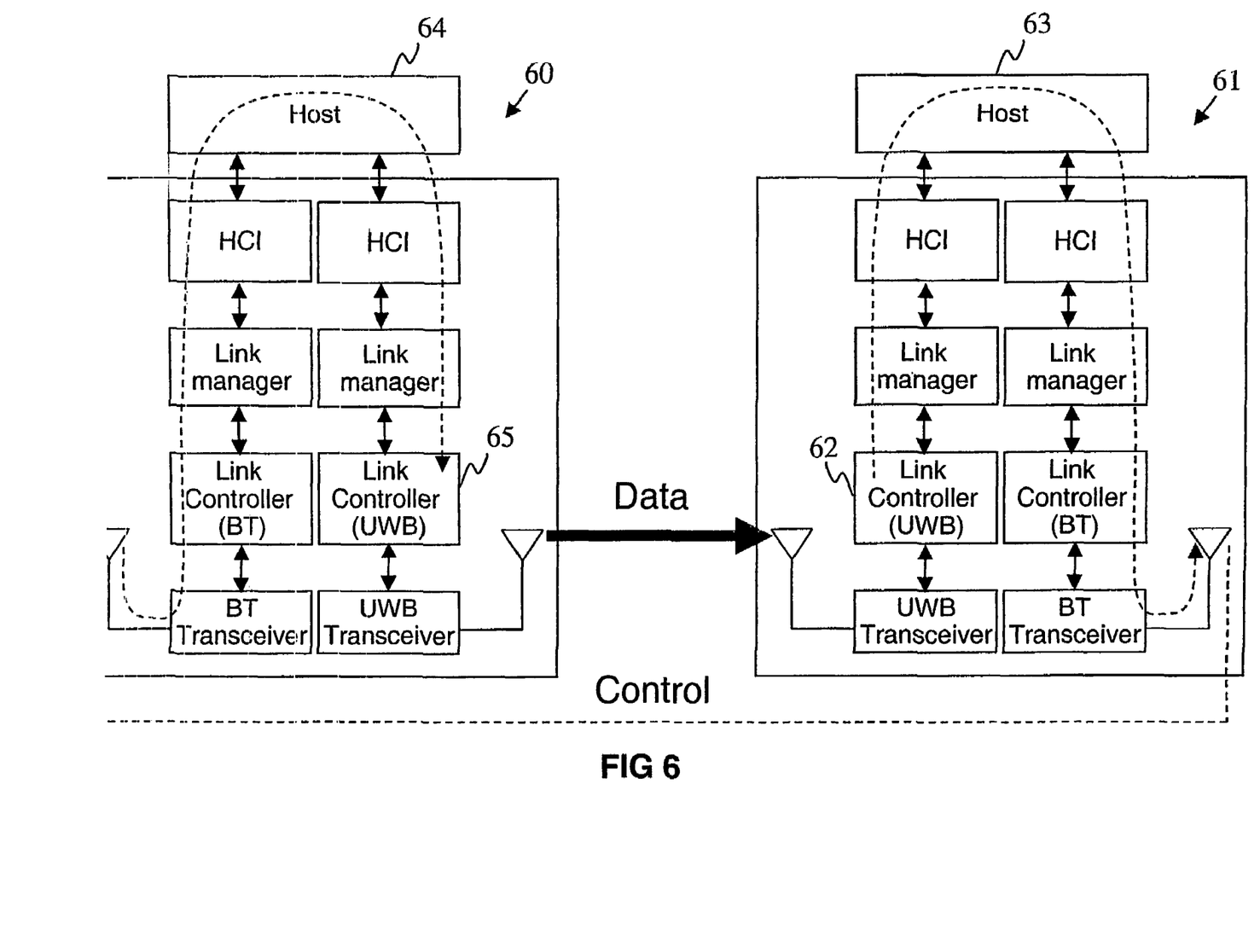
FIG. 6 illustrates a protocol stack structure depicting a method of sending control data bits by using data channel of a separate radio.

FIG. 6 illustrates a protocol stack structure depicting a method of sending control data bits by using data channel of a separate radio. Similarly to FIG. 5, a rough protocol stack structure of two communication parties 60 and 61 is shown, but now the communicating parties comprise also a Bluetooth radio in addition to UWB radio and thereby the communicating parties comprise two protocol stacks.

Also herein data is sent "normally" from application layer (Host) at the transmitting end 60 via the UWB protocol stacks (HCI, link manager, link controller, transceiver) to application layer at the receiving end 61. However, control data is now sent via the Bluetooth protocol stacks (dashed arrows). Control data is generated normally at the UWB link controller level 62 at the communication party 61, but instead of using the UWB transceiver for sending the control data, the control data, which may be for example sequence numbers of the acknowledged data packets, is conveyed to the application layer 63 (via link manager and HCI layers as an own logical link/transport link separate from the data). From there the control data is sent as payload in a Bluetooth connection to the communicating party 60, wherein the control data is conveyed as Bluetooth payload to the application layer 64 and via the UWB protocol stack to the UWB link controller 65. In case of acknowledging data packets, the sequence numbers are extracted in the UWB link controller. The UWB retransmission buffer is emptied with regard of the acknowledged data packets and the data packets in the retransmission buffer, which have been sent but not acknowledged, are retransmitted. Now, as Bluetooth data channel is used for sending control data, the UWB communication link can be fully used for transmitting data between the communicating parties 60 and 61. Equally, the control data can be transmitter simultaneously with transmitting actual data.

In principle, the Bluetooth radio of this example is used simply for transmitting for example sequence numbers as payload. With respect to the UWB implementation this example requires that link control information is not transmitted in the UWB link but packaged as payload data for transmission by the Bluetooth radio. There may be for example a separate logical link from the UWB link controller to the application layer in order to avoid mixing actual data with the control information. In practice, there may be some delay in transmitting UWB control information via the Bluetooth link and this needs to be taken into account in the UWB implementation. However, in the case of acknowledgement information, after the first acknowledgements have been received, the UWB link controller knows when the following acknowledgements are expected and can therefore follow acknowledgements even though there was some delay in receiving the acknowledgements.

It must be noted that the Bluetooth radio in FIG. 6 may be replaced by any suitable radio. For example any other type of WPAN radio, such as WLAN radio, may be used. A suitable radio may have lower data rate than UWB radio has, if only control data is sent via the other radio.

Particular implementations and embodiments of the invention have been described above. It is clear to a person skilled in the art that the invention is not restricted to these implementations and embodiments, but that the invention can be implemented in other embodiments using equivalent means without deviating from the characteristics of the invention. For example, the invention is not restricted to sending specific control information in uplink. Rather, the invention can be used in connection with sending any suitable uplink information. Additionally, the invention may be used in connection with any suitable wideband technology or technology that employs narrow pulses in data transmission purposes. The scope of the invention is only restricted by the attached patent claims.

The invention claimed is:

1. A communication method comprising:
    establishing a wideband communication link between a first device and a second device,
    receiving a first set of consecutive data bits from said first device at said second device by means of a first set of pulses,
    transmitting a second set of bits from said second device to said first device at least partially simultaneously or at least partially interlaced with said first set of bits characterized by:
    negotiating a pulse repetition frequency (PRF) for said communication link, at least when the PRF for the communication link is not already known, and
    negotiating on the basis of the PRF of said communication link, whether said second set of bits is sent interlaced with the first set of bits.

2. The method of claim 1, wherein said pulses are narrow pulses.

3. The method of claim 1, wherein said pulses are spaced apart in time domain by a certain guard time and said second set of bits is transmitted by means of a second set of pulses sent during said guard times.

4. The method of claim 3 further comprising:
    negotiating on the basis of the PRF of said communication link, whether said guard times are used for sending said second set of bits.

5. The method of claim 1, wherein a separate radio is used for transmitting said second set of bits.

6. The method of claim 5, wherein said separate radio is a Wireless Personal Area Network (WPAN) radio.

7. The method of claim 5, wherein said second set of bits is transmitted as payload in a data channel of the separate radio.

8. The method of claim 1, wherein said second set of bits comprises control data.

9. The method of claim 1, wherein said wideband communication link is an ultra-wideband (UWB) communication link.

10. A system comprising
a first device and a second device configured to establish a wideband communication link between said first and second devices, said first device comprising a first transmitter configured to send a first set of consecutive data bits to said second device and said second device comprising a first receiver configured to receive said first set of consecutive data bits from said first device, said first set of bits being sent by means of a first set of pulses,
said second device further comprises a second transmitter configured to send a second set of bits to said first device at least partially simultaneously or at least partially interlaced with receiving said first set of bits from said first device, and
said first device further comprises a second receiver configured to receive said second set of bits from said second device at least partially simultaneously or at least partially interlaced with sending said first set of bits to said second device, characterized in that the first device and the second device are further configured:
to negotiate a pulse repetition frequency (PRF) for said communication link, at least when the PRF for the communication link is not already known, and
to negotiate on the basis of the PRF of said communication link, whether said second set of bits is sent interlaced with the first set of bits.

11. A device comprising
a receiver configured to receive a first set of consecutive data bits from another device, said first set of bits being sent by means of a first set of pulses, and
a transmitter configured to send a second set of bits to said another device at least partially simultaneously or at least partially interlaced with receiving said first set of bits from said another device, characterized in that said device further comprises:
means for negotiating a pulse repetition frequency (PRF) for said communication link, at least when the PRF for the communication link is not already known, and
means for negotiating on the basis of the PRF of said communication link, whether said second set of bits is sent interlaced with the first set of bits.

12. The device of claim 11, wherein said pulses are narrow pulses.

13. The device of claim 11, wherein
said receiver is configured to receive said first set of pulses so that there is a certain guard time between the pulses, and
said transmitter is configured to send a second set of pulses forming said second set of bits during said guard times.

14. The device of claim 13 further comprising:
means for negotiating with said another device the PRF for said first set of pulses, at least when said PRF is not already known, and
means for negotiating on the basis of said PRF, whether said guard times are used for sending said second set of bits.

15. The device of claim 11, wherein said transmitter and said receiver employ different radio technologies.

16. The device of claim 15, wherein said transmitter is a Wireless Personal Area Network (WPAN) radio transmitter.

17. The device of claim 11, wherein said receiver is an ultrawideband (UWB) receiver.

18. The device of claim 11, wherein said second set of bits comprises control data.

19. The device of claim 11, wherein said device is one of the following: a communication device, a mobile phone, a laptop computer, a desktop computer, a Personal Digital Assistant (PDA), and a digital camera.

20. A device comprising
a transmitter configured to send a first set of consecutive data bits to another device by means of a first set of pulses, and
a receiver configured to receive a second set of bits from said another device at least partially simultaneously or at least partially interlaced with sending said first set of bits to said another device, characterized in that said device further comprises:
means for negotiating a pulse repetition frequency (PRF) for said communication link, at least when the PRF for the communication link is not already known, and
means for negotiating on the basis of the PRF of said communication link, whether said second set of bits is sent interlaced with the first set of bits.

21. The device of claim 20, wherein said pulses are narrow pulses.

22. The device of claim 20, wherein
said transmitter is configured to send said first set of pulses so that there is a certain guard time between the pulses, and
said receiver is configured to receive a second set of pulses forming said second set of bits during said guard times.

23. The device of claim 22 further comprising:
means for negotiating with said another device the PRF for said first set of pulses, at least when said PRF is not already known, and
means for negotiating on the basis of said PRF, whether said guard times are used for receiving said second set of bits.

24. The device of claim 20, wherein said transmitter and said receiver employ different radio technologies.

25. The device of claim 24, wherein said receiver is a Wireless Personal Area Network (WPAN) radio receiver.

26. The device of claim 20, wherein said transmitter is an ultrawideband (UWB) transmitter.

27. The device of claim 20, wherein said second set of bits comprises control data.

28. The device of claim 20, wherein said device is one of the following: a communication device, a mobile phone, a laptop computer, a desktop computer, a Personal Digital Assistant (PDA), and a digital camera.

29. A computer-readable medium comprising a computer program executable in a communication device, the communication device being configured to receive a first set of consecutive data bits from another device, said first set of bits being sent by means of pulses, said computer program controlling said communication device to
send a second set of bits to said another device at least partially simultaneously or at least partially interlaced with receiving said first set of bits from said another device, characterized by said computer program further controlling said communication device
to negotiate a pulse repetition frequency (PRF) for said communication link, at least when the PRF for the communication link is not already known, and
to negotiate on the basis of the PRF of said communication link, whether said second set of bits is sent interlaced with the first set of bits.

30. A computer-readable medium comprising a computer program executable in a communication device, the communication device being configured to send a first set of consecutive data bits to another device by means of pulses, said computer program controlling said communication device to receive a second set of bits from said another device at least partially simultaneously or at least partially interlaced with sending said first set of bits to said another device, characterized by said computer program further controlling said communication device:

to negotiate a pulse repetition frequency (PRF) for said communication link, at least when the PRF for the communication link is not already known, and to negotiate on the basis of the PRF of said communication link, whether said second set of bits is sent interlaced with the first set of bits.

* * * * *

UNITED STATES PATENT AND TRADEMARK OFFICE
CERTIFICATE OF CORRECTION

| | |
|---|---|
| PATENT NO. | : 7,613,222 B2 |
| APPLICATION NO. | : 10/574591 |
| DATED | : November 3, 2009 |
| INVENTOR(S) | : Reunamaki et al. |

It is certified that error appears in the above-identified patent and that said Letters Patent is hereby corrected as shown below:

On the cover page,

[*] Notice:   Subject to any disclaimer, the term of this patent is extended or adjusted under 35 USC 154(b) by 531 days.

Delete the phrase "by 531 days" and insert -- by 698 days --

Signed and Sealed this

Tenth Day of August, 2010

David J. Kappos
*Director of the United States Patent and Trademark Office*